E. W. WEAVER.
AUTOMOBILE STEERING POST.
APPLICATION FILED OCT. 22, 1920.
1,403,660.
Patented Jan. 17, 1922.
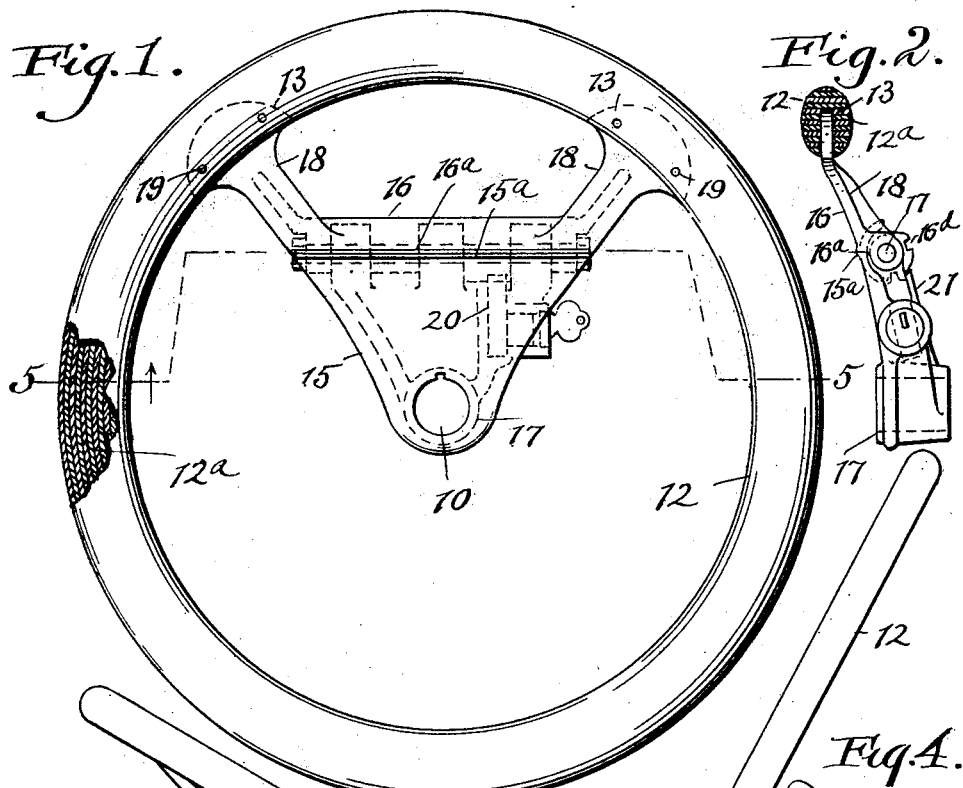
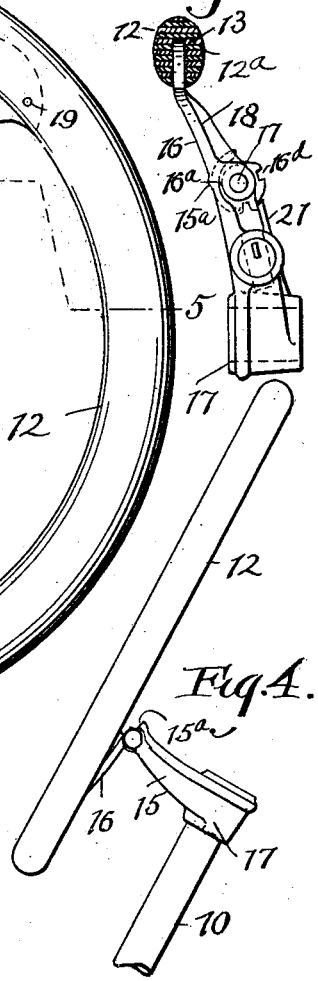
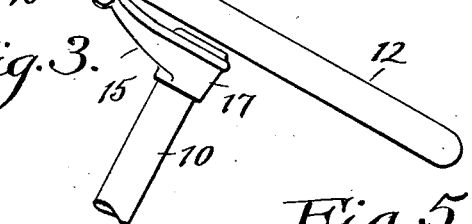
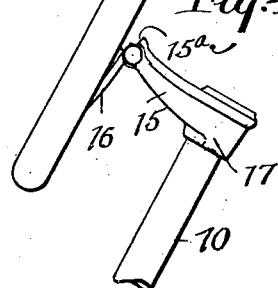
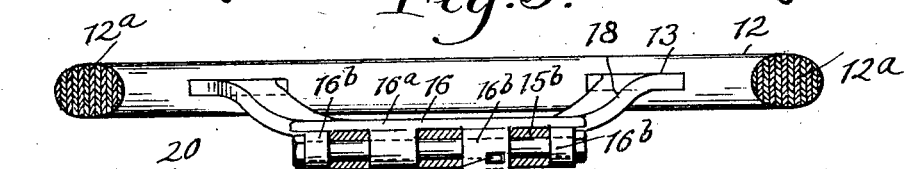
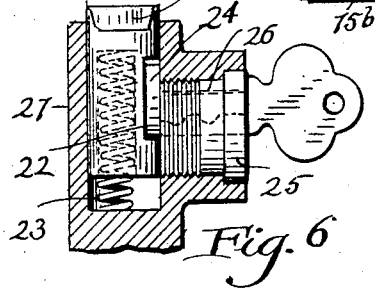

UNITED STATES PATENT OFFICE.

ELVERTON W. WEAVER, OF CLEVELAND HEIGHTS, OHIO.

AUTOMOBILE STEERING POST.

1,403,660.  Specification of Letters Patent.  Patented Jan. 17, 1922.

Application filed October 22, 1920. Serial No. 418,792.

*To all whom it may concern:*

Be it known that I, ELVERTON W. WEAVER, a citizen of the United States, residing at Cleveland Heights, in the county of Cuyahoga and State of Ohio, have invented a certain new and useful Improvement in Automobile Steering Posts, of which the following is a full, clear, and exact description.

The object of this invention is to provide an automobile with a tilting steering wheel which is strong and of attractive appearance, and is capable of being locked in either the operative or inoperative position. The invention consists in the construction and combination of parts shown in the drawings and hereinafter described and pointed out definitely in the appended claims.

In the drawings, Fig. 1 is a top view of a steering wheel which embodies the invention; Fig. 2 is a side view projected from Fig. 1 of the jointed arm which forms a part of the steering wheel; Fig. 3 is a side elevation when the steering wheel is in operative position; Fig. 4 is a side elevation when the steering wheel is in inoperative position; Fig. 5 is a rear elevation in the plane of line 5—5 on Fig. 1; Fig. 6 is a sectional plan view of the lock ball mechanism; and Fig. 7 is a side elevation, partly sectioned of said mechanism.

Referring to the parts by reference characters, 10 represents the steering post of an automobile, to the upper end of which a steering wheel which constitutes the present invention is connected.

12 represents the annular rim of the steering wheel. According to the prevailing custom this rim is made of wood; but the specific construction shown is unlike any previously known steering wheel rim in that it is formed by helically winding upon itself a thin strip of wood veneering and gluing together the superimposed layers $12^a$. The annulus so formed is then shaped and finished as desired. It is believed that a wood rim constructed as described is much stronger than most, if not all, of the wood rims of like dimensions which have heretofore been used for the stated purpose. It is because the rim has this great strength that it is enabled to withstand the strains incident to the performance of its functions even though connected with the steering post by a single arm as hereinafter stated.

This wheel rim is connected with the steering post by a single jointed triangular arm, the outer or forward end of which occupies about one-sixth of the circumference of the wheel rim.

This triangular arm is composed of two plates 15 and 16 which are hinged together in front of the post 10 on a horizontal transverse axis which is below the two plates. The plate 15 is provided at its rear end with a sleeve 17 which is adapted to fit over and be secured to the steering post. The front edge $15^a$ of this plate is straight and normally extends transversely.

The rear edge of the plate 16 is shaped to fit the front edge of the plate 15, when the steering wheel rim is in operative position, that is to say, when it has been swung to the position shown in Fig. 3, in which it is co-axial with the steering post. The plate 15 is formed adjacent its front edge with a plurality of depending aligned hinge eyes $15^b$, the axis of said hinge eyes being substantially in the same plane as that which passes through the meeting edges $15^a$, $16^a$, of the two plates. The plate 16 is similarly provided adjacent its rim edge with a plurality of depending aligned hinge eyes $16^b$ which go between the hinge eyes $15^b$ of plate 15, and are pivotally connected therewith by a transverse pintle pin 17. It is evident that when the parts are so constructed and connected, and when the rear part of the rim is swung down to the operative position shown in Fig. 3, the adjacent edges $15^a$, $16^a$, of these two plates will come into contact and act as stops to prevent any further movement downward of the rear part of the wheel rim. It is evident also that the rear part of the wheel rim may be swung upward and forward to the position shown in Fig. 4, where it is out of the way.

The front plate 16 is preferably formed at its front end with two diverging arms 18, the front ends $18^a$ of which are flattened. The rim is provided with kerfs 13 to which these flattened ends are fitted, and into which they may be inserted by relative rearward movement of the wheel rim. The flattened ends of these arms and the wheel rim may be secured together by rivets or screws, 19. It is because the outer flattened ends of these arms occupy such a small part of the circumference of the rim, that the kerfs in the rim and the flattened ends of the arm may be made to fit each other and may be assembled as stated.

While it is not perhaps necessary it is nevertheless desirable that means be provided by which to connect together the two plates of the wheel arm so as to hold these two plates against relative movement when the rim is in operative position, and to similarly hold the plates against relative movement when the wheel rim has been swung up to the operative position.

To accomplish this result a bolt 20 is mounted in a barrel 21 formed on the under side of the plate 15. This bolt may be shot forward so as to cause its slightly tapered front end to enter either of the two tapered notches 16$^c$, 16$^d$, formed in the periphery of one of the hinge eyes 16$^b$ which is a part of the front plate 16. A rock shaft 26 may be rotatively mounted in the wall of the barrel 21 and may have on its inner end a cam 24 which loosely fits a recess 22 in the side of the bolt. This cam preferably does not fit this recess closely but does permit some relative movement of the spring bolt relative to the cam; but the fit is such that by turning the shaft the cam will withdraw the spring bolt and hold it withdrawn or will move the spring bolt forward and hold it in its locking position. In the construction shown the so-called rock shaft which carries the cam is a part of a lock 25 of familiar construction by reason of which a fitted key is required to turn said rock shaft.

Having described my invention, I claim:

1. An automobile steering wheel comprising an annular rim, and a single jointed arm composed of two plates which are pivoted together on a transverse axis located below the meeting edges of said two plates, the rear plate being provided at its rear end with a sleeve hub for engagement with an automobile steering post, and the front plate being rigidly connected with said rim.

2. An automobile steering wheel comprising an annular rim and a single jointed arm composed of two plates which are pivoted together on a transverse axis located below the meeting edges of said two plates, the rear plate being provided at its rear end with a sleeve hub for engagement with an automobile steering post and the front plate being rigidly connected with said rim, the adjacent transverse edges of the two plates being formed for engagement when the wheel rim is in a position coaxial with said sleeve hub.

3. An automobile steering wheel comprising an annular rim, and a single jointed arm composed of two plates which are pivoted together on a transverse axis located below the meeting edges of said two plates, the rear plate being provided at its rear end with a sleeve hub for engagement with an automobile steering post and the front plate being rigidly connected with said rim, and means carried by one of said plates for engagement with a part of the other plate to lock the plates against relative movement when they occupy either of two positions relative to each other, namely, a position in which the wheel is operative and one in which the wheel is inoperative.

4. A steering wheel comprising an annular rim and a jointed arm composed of two plates, the rear plate having at its rear end a sleeve hub for engagement with an automobile steering post and having at its front end a series of transversely extended aligned depending hinge eyes, and the front plate being formed with a plurality of aligned depending hinge eyes located adjacent its front edge and a hinge pintle connecting said two series of hinge eyes,—the front end of the front plate being connected with said rim.

5. An automobile steering wheel comprising an annular rim having spaced apart kerfs formed in its inner periphery and located on the same side of a diametrical plane, and a single jointed arm for connecting said rim with a steering post,—the said jointed arm being composed of two hinged together plates of which the front plate has at its front end two branches whose ends are flattened and are fitted to said kerfs,—the distance between the remote part of said flattened ends being less than the inside diameter of said rim.

6. An automobile steering wheel comprising an annular rim, and a single jointed arm composed of two plates, the rear plate having at its rear end a sleeve hub for engagement with an automobile steering post and having at its front end a series of transversely extended aligned depending hinge eyes, and the front plate being connected at its front end with said rim, and being formed with a plurality of aligned depending hinge eyes located adjacent its front edge, a hinge pintle connecting said two series of hinge eyes,—one of the hinge eyes of one of said plates being provided with two notches in different radial planes, and a bolt mounted on the other plane for engagement with said notches.

7. An automobile steering wheel comprising an annular rim and a single jointed arm composed of two plates, the rear plate having at its rear end a sleeve hub for engagement with an automobile steering post and having at its front end a series of transversely extended aligned depending hinge eyes the front plate being connected at its front end with said rim and being formed with a plurality of aligned depending hinge eyes located adjacent its rear edge, a hinge pintle connecting said two series of hinge eyes,—one of the hinge eyes of one of said plates being provided with two notches in different radial planes, a bolt mounted on the other plane for engagement with said notches, and a lock to control said bolt.

8. A steering wheel for automobiles comprising a rim made up of a helically wound strip of wood veneering, the engaging surfaces of which are glued together, a jointed arm comprising two plates hinged together on an axis which is parallel with a diametrical plane of said rim, the rear plate being provided with means for connecting said arm with the steering post of an automobile, and the front plate being provided with two branches having flattened ends, the distance between the remote parts of said flattened ends being less than the inside diameter of said rim, and said rim being provided with two kerfs which extend through numerous layers of said wood veneering and are shaped to receive and fit the flattened ends of said branches.

9. An automobile steering wheel comprising an annular rim and a single jointed arm for connecting said rim with the steering post,—said jointed arm being composed of two hinged together plates of which the front plate has at its front end two branches whose ends are adapted for connection with the wheel rim,—the distance between the remote ends of said arms being less than the inside diameter of the rim.

In testimony whereof, I hereunto affix my signature.

ELVERTON W. WEAVER.